United States Patent [19]

Peppard

[11] Patent Number: 5,134,266
[45] Date of Patent: Jul. 28, 1992

[54] MOBILE DEICING APPARATUS

[76] Inventor: Dennis L. Peppard, 580 Seminoe, Casper, Wyo. 82609

[21] Appl. No.: 604,674

[22] Filed: Oct. 26, 1990

[51] Int. Cl.[5] .......................... H05B 6/64; F23L 9/00; B64D 15/00
[52] U.S. Cl. .......................... 219/10.55 R; 126/271.1; 244/134 R
[58] Field of Search ................ 219/10.55 A, 10.55 R, 219/121.16, 121.6; 244/134 R, 134 D, 134 C; 126/271.2 A, 271.2 B, 271.2 C, 271.1, 110 R, 110 AA; 37/228, 232, 197

[56] References Cited

U.S. PATENT DOCUMENTS

| | | | |
|---|---|---|---|
| 3,041,748 | 7/1962 | Wetzel | 126/271.2 C |
| 3,053,460 | 9/1962 | Rudy | 126/271.1 |
| 3,083,528 | 4/1963 | Brown | 219/10.55 A |
| 3,174,477 | 3/1965 | Wilson | 126/271.2 A |
| 4,256,944 | 3/1981 | Brandon | 219/10.55 A |
| 4,353,176 | 10/1982 | Hess | 37/228 |
| 4,615,129 | 10/1986 | Jackson | 37/197 |
| 4,676,224 | 6/1987 | Ohno | 126/343.5 R |
| 4,813,165 | 3/1989 | Pelazza | 37/228 |
| 4,826,107 | 5/1989 | Thornton-Trump | 214/134 R |
| 4,900,891 | 2/1990 | Vega et al. | 219/121.6 |

Primary Examiner—Marvin M. Lateef
Assistant Examiner—Tuan Vinh To
Attorney, Agent, or Firm—Dean P. Edmundson

[57] ABSTRACT

Mobile apparatus is described for melting accumulated ice from surfaces such as aircraft, spacecraft, rocket assemblies, etc. The apparatus includes a heating source for heating air, a compressor, an elongated boom with a discharge head for discharging heated air, and controls for controlling the position of the boom. The apparatus avoids the need for chemicals and accordingly reduces pollution problems.

11 Claims, 18 Drawing Sheets

Continued

MOBILE DEICING APPARATUS

FIELD OF THE INVENTION

This invention relates to an improved technique and apparatus for supplying heated air. More particularly, this invention relates to techniques and apparatus for melting ice off of aircraft, spacecraft, rocket assemblies, naval vessels, and other equipment or surfaces which require deicing.

BACKGROUND OF THE INVENTION

In areas of the world where there is snowfall, sleet, or heavy frost, a great amount of time, effort and money are spent every winter removing accumulated ice from various types of craft and equipment. This is most readily observed in connection with commercial and private aircraft. Ice must be removed from such craft before they can be safely used for air transportation.

The conventional technique for removing ice from the surfaces of aircraft is to spray the aircraft with heated ethylene glycol (antifreeze) compositions. This technique presents several problems and has associated drawbacks, including: (1) disposal problems because the antifreeze compositions can damage ground water supplies; (2) flammability problems due to inclusion of alcohol in the compositions; (3) damage to the skin of the aircraft caused by flying chunks of loosened, but not melted, ice; (4) turbine damage due to ingestion of antifreeze; (5) the cost of purchasing, storing and heating the antifreeze compositions to the required temperatures; and (6) the cost and complexity of the equipment required to heat and apply the antifreeze to the skin of the aircraft.

There are also other types of equipment which must be cleared of accumulated ice before putting such equipment into use (e.g., spacecraft, rocket assemblies). In addition, it is also sometimes desirable to remove accumulated ice from other surfaces, e.g., heavy equipment, cranes, steel frameworks, and other surfaces where accumulated ice presents a problem or safety hazard.

It is an object of this invention to provide an improved technique and improved apparatus for melting ice from the surface of aircraft, spacecraft, rocket assemblies, and other surfaces.

It is another object of this invention to eliminate the problems associated with the conventional use of antifreeze compositions to remove accumulated ice.

SUMMARY OF THE INVENTION

In accordance with the present invention there is provided mobile apparatus useful for melting accumulated ice from surfaces, such as aircraft, spacecraft, rocket assemblies, naval vessels and other surfaces from which it is desired to remove ice. In one embodiment the apparatus comprises:

(a) a frame (e.g., a wheeled frame, skid frame, etc.);
(b) a power source for propelling the frame;
(c) a heat source for heating air;
(d) compressor means for compressing air;
(e) boom means carried by the frame, the boom including a discharge head;
(f) air conduit means carried by the boom for guiding heated air from the heat source; and
(g) control means for controlling the position of the boom.

Heated air is discharged through the discharge head on the boom and is directed onto the ice to be melted. The high temperature of the air can rapidly melt the ice and allow the resulting water to run off the surface. No polluting chemicals are required.

The apparatus of this invention is particularly useful in connection with deicing of commercial and private aircraft. With hundreds of flights daily in the winter in regions of the world where ice on the surface of aircraft is a problem, the costs involved in deicing such aircraft using conventional apparatus and techniques are tremendous. Also, the pollution problems caused by the use of antifreeze compositions are avoided in the present invention.

The apparatus also eliminates the risk of turbine damage due to ingestion of antifreeze compositions. The apparatus is also much more economical than previously used equipment. The boom is extensible and the discharge head is tiltable, so that the compressed heated air can be directed to any desired location.

The apparatus of this invention provides high volume low density heat (e.g., in excess of 14 million BTU per hour). The boom is insulated to minimize heat loss.

Other advantages of the apparatus and techniques of the present invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
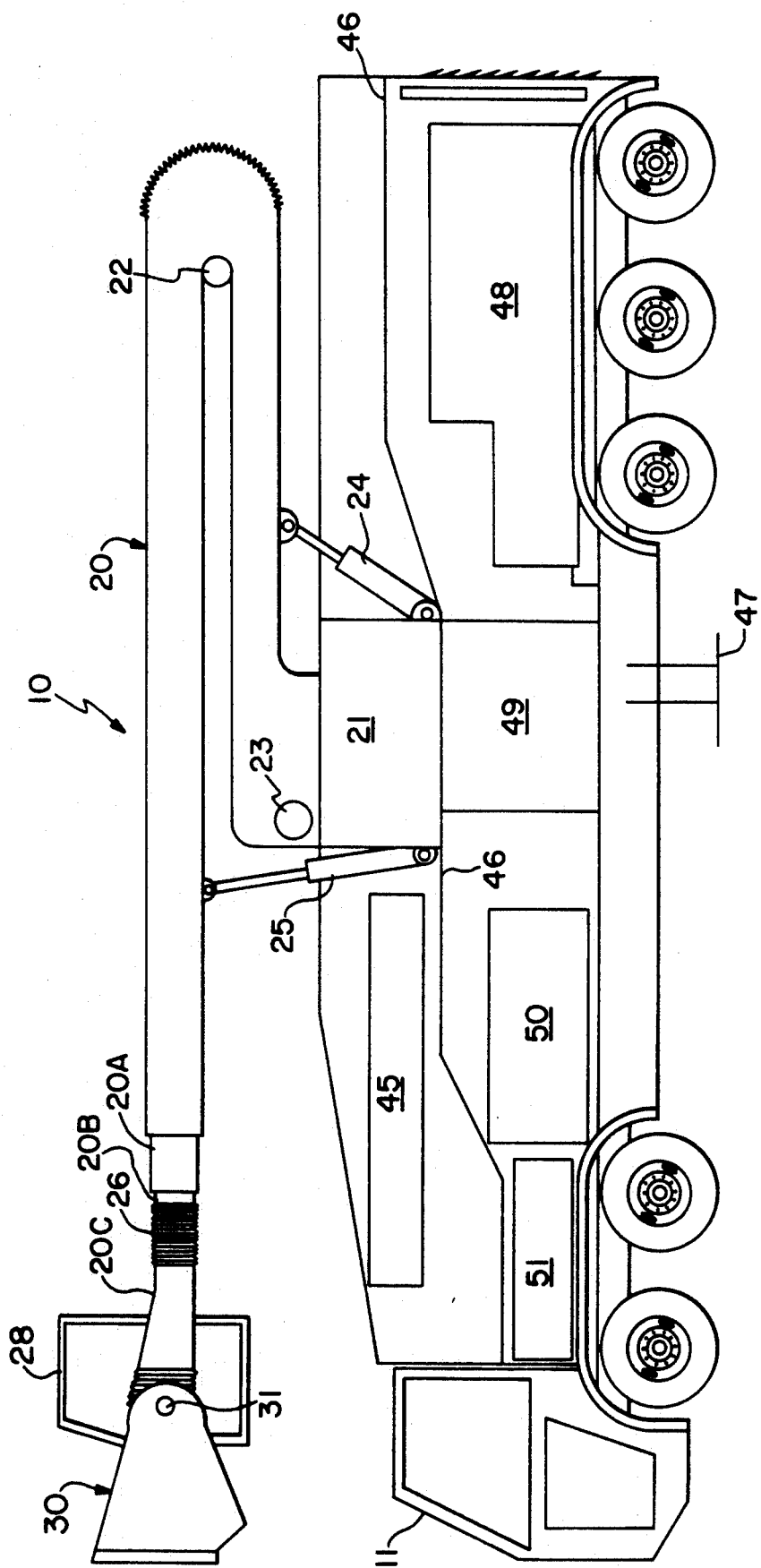
FIG. 1 is a side elevational view of one embodiment of deicer apparatus of the invention.

In the drawings there is illustrated one embodiment of mobile deicing apparatus 10 of this invention. The apparatus includes a wheeled frame (e.g., a truck frame) with an engine to propel it, and also includes a cab 11 for the driver. Stabilizer jacks 47 carried on the frame may be lowered to stabilize the apparatus before deicing is begun.

An elongated boom 20 is rotatably carried on top of the truck. The base 21 of the boom is carried on bearings which allow it to be rotated in either direction, as desired. For example, a hydraulic motor and gear system may be operatively connected to the base to control rotation of the boom relative to the remainder of the apparatus.

The boom is preferably extensible. For example, as illustrated in the drawings, the boom includes telescoping sections 20A and 20B which enable the leading end of the boom to be extended outwardly and retracted, as desired. There may be any number of telescoping sections, and the boom can be extended outwardly any desired distance.

The boom preferably also includes upper and lower sections whose ends are connected together by means of hinge 22. One end of the lower section is connected to the base 21 by means of hinge 23. Hydraulic cylinder 24 controls the raising and lowering of the lower boom section, and hydraulic cylinder 25 controls raising and lowering of the upper section of the boom. Thus, the boom can be easily raised or lowered to any desired height.

The air discharge head 30 on the outer end of the upper boom section can also be tilted upwardly or downwardly, as desired, by means of a motor. The motor is preferably hydraulic and is adapted to power a gear 33 which engages gear 34 on the rear portion of the discharge head. The discharge head 30 is pivotably mounted to the end of the upper boom section by means of shafts 31 and bearings 31A.

Figure 8:
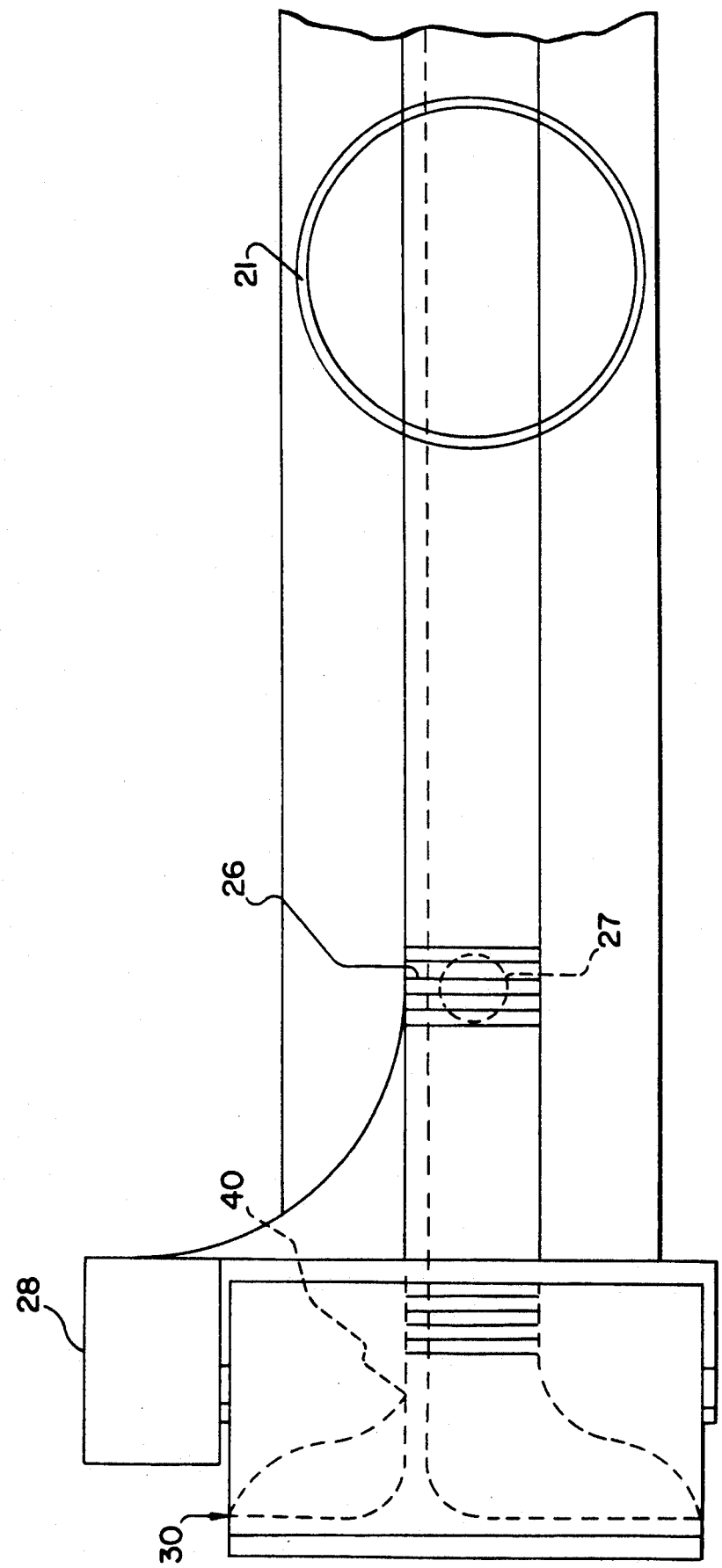
FIG. 8 is a top view of the boom assembly.
Figure 9A:
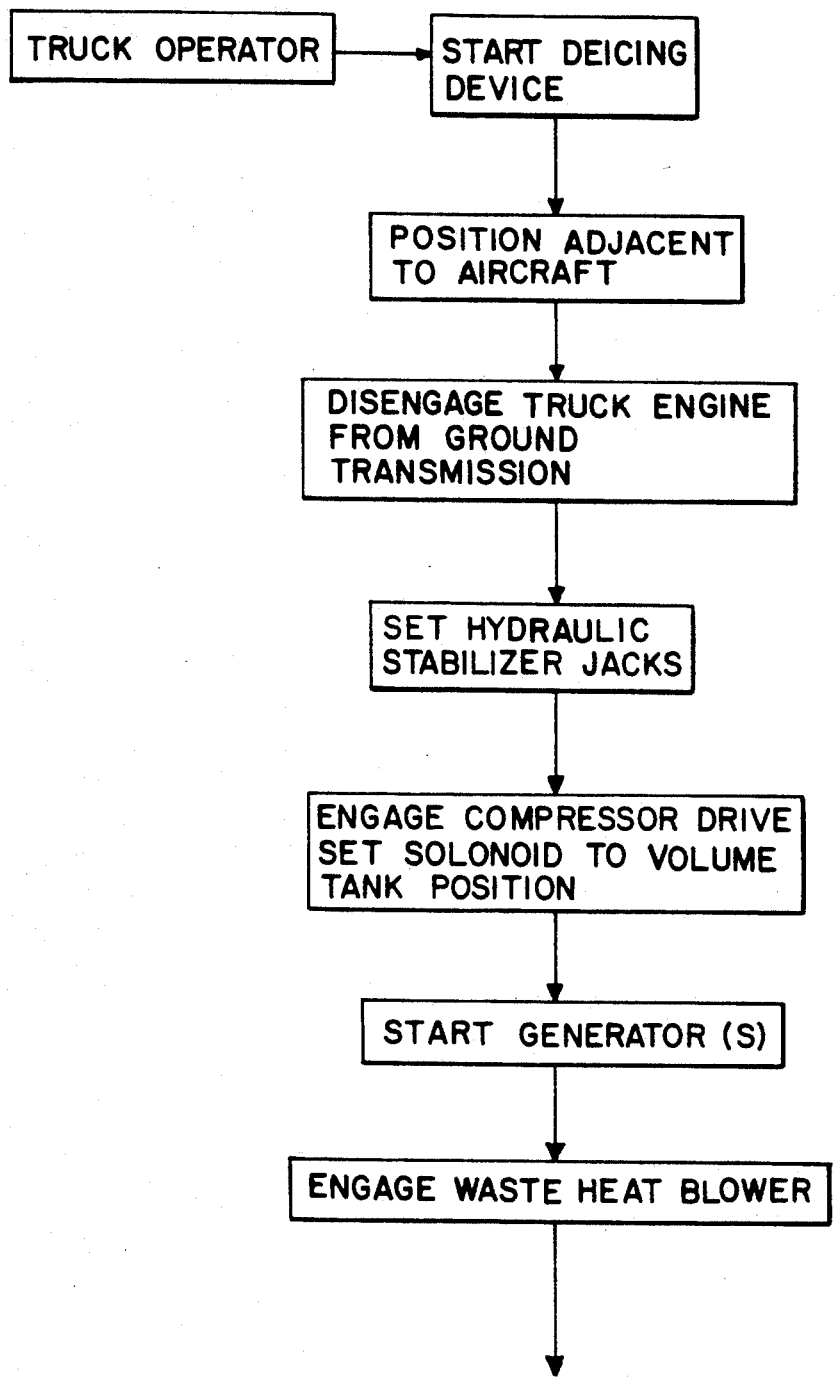
FIG. 9A through 9D are block diagrams illustrating the operation of the apparatus of FIG. 1.
Figure 9B:
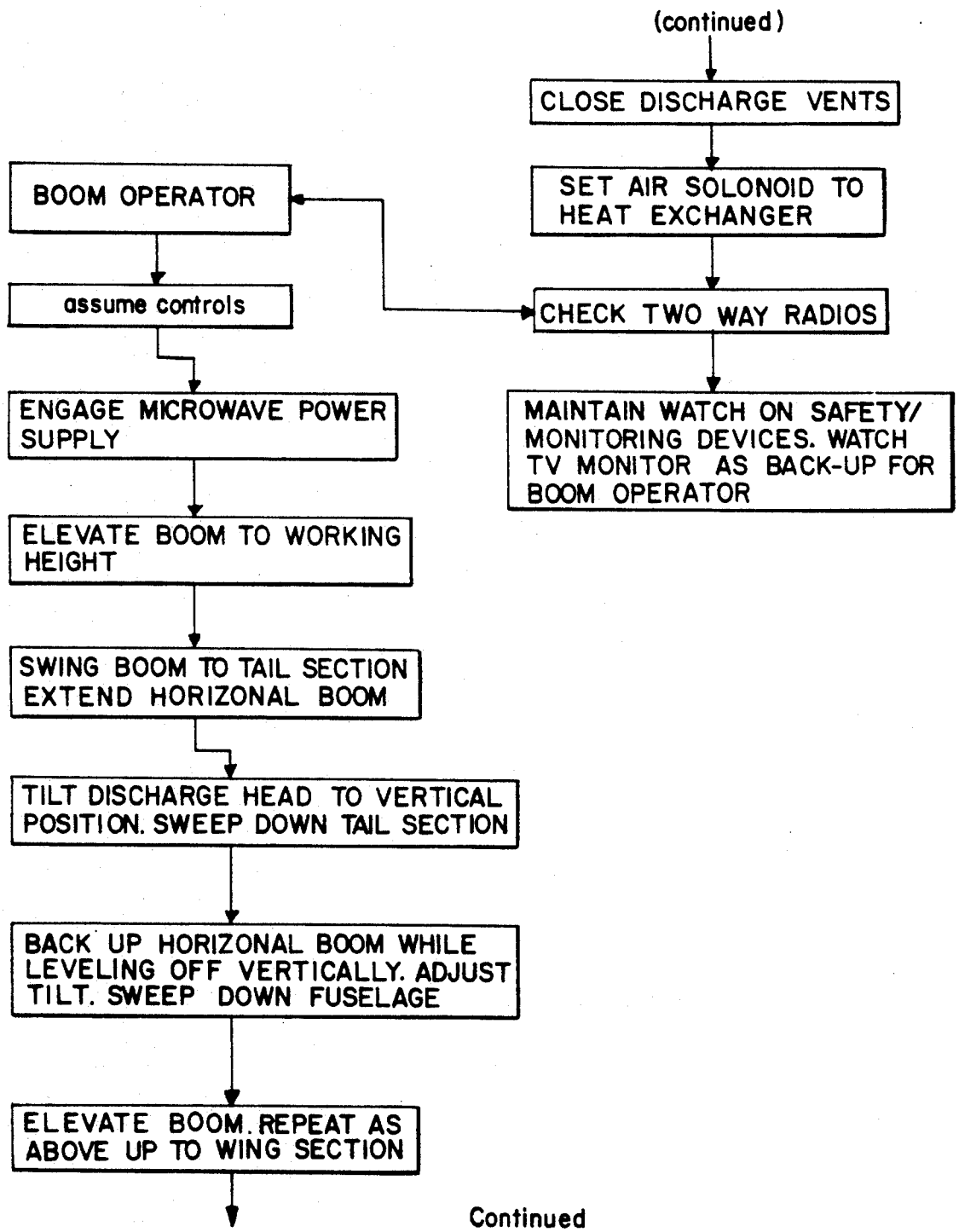
Figure 9C:
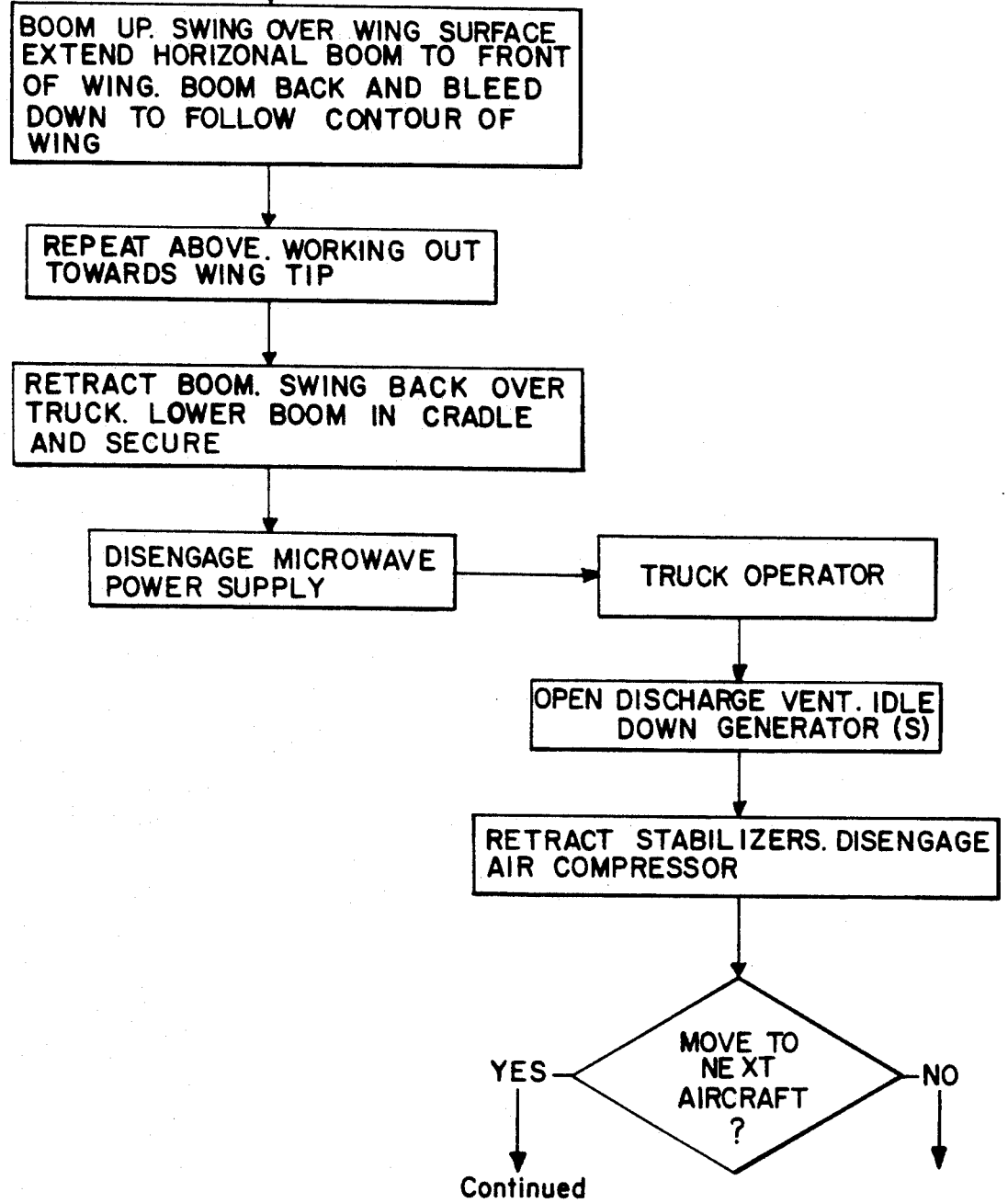
Figure 9D:
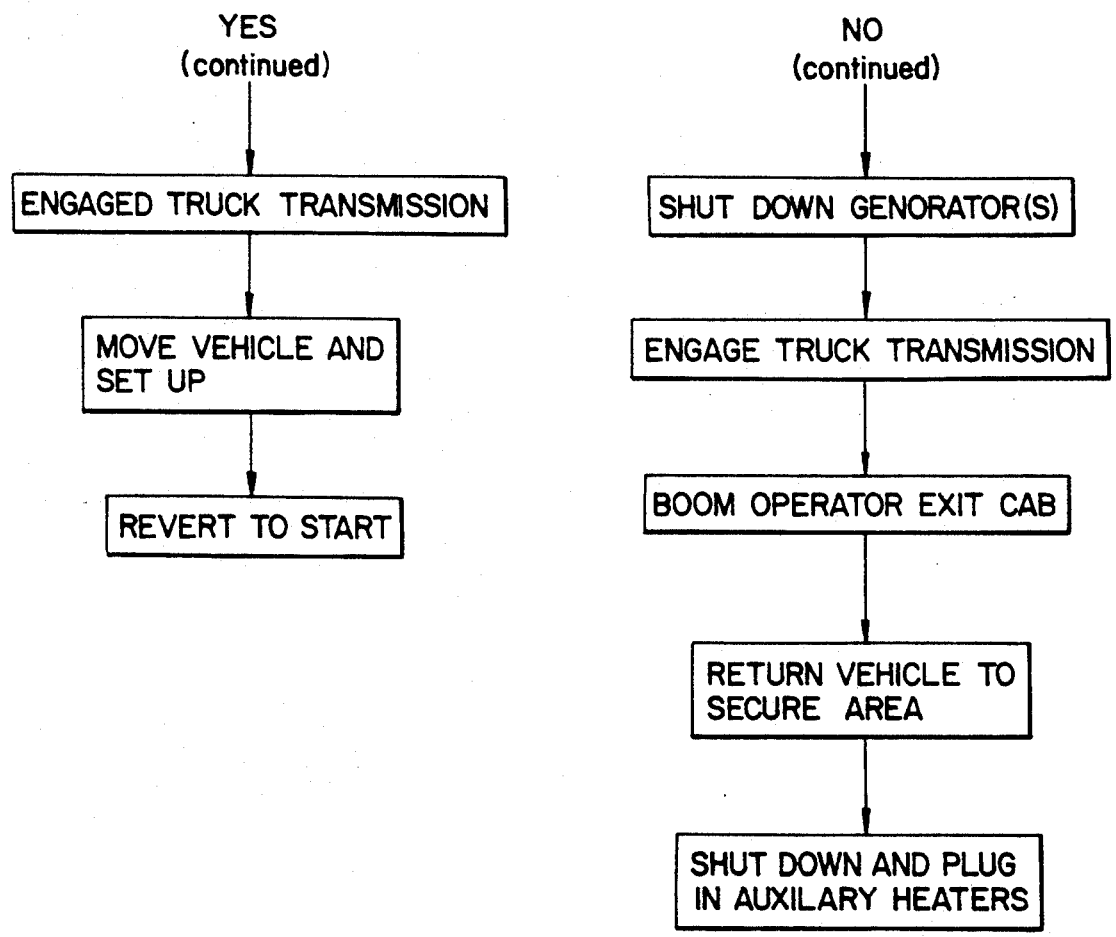
Figure 10A:
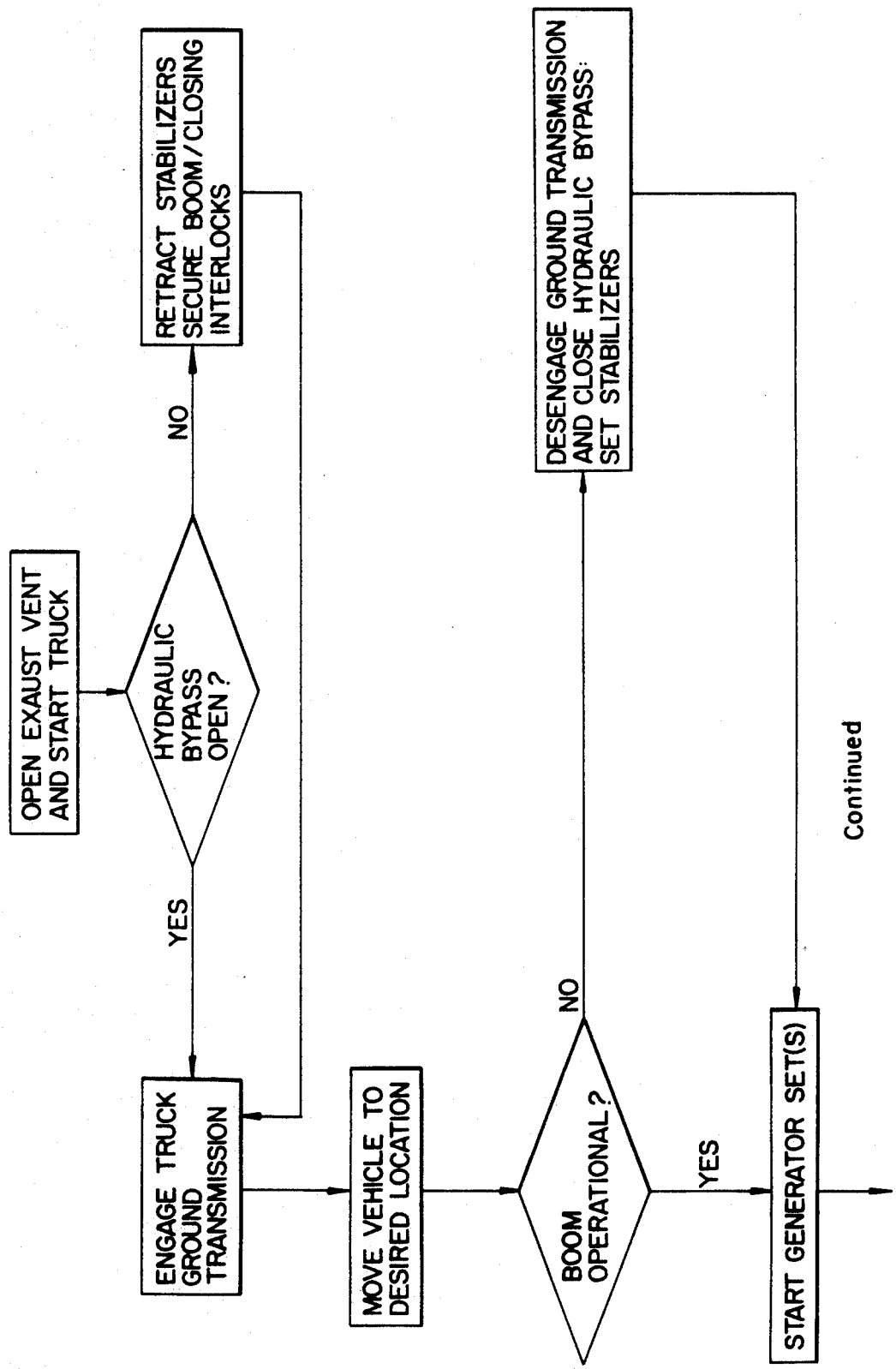
FIGS. 10A through 10D are block diagrams illustrating various safety considerations involved with operation of the apparatus.
Figure 10B:
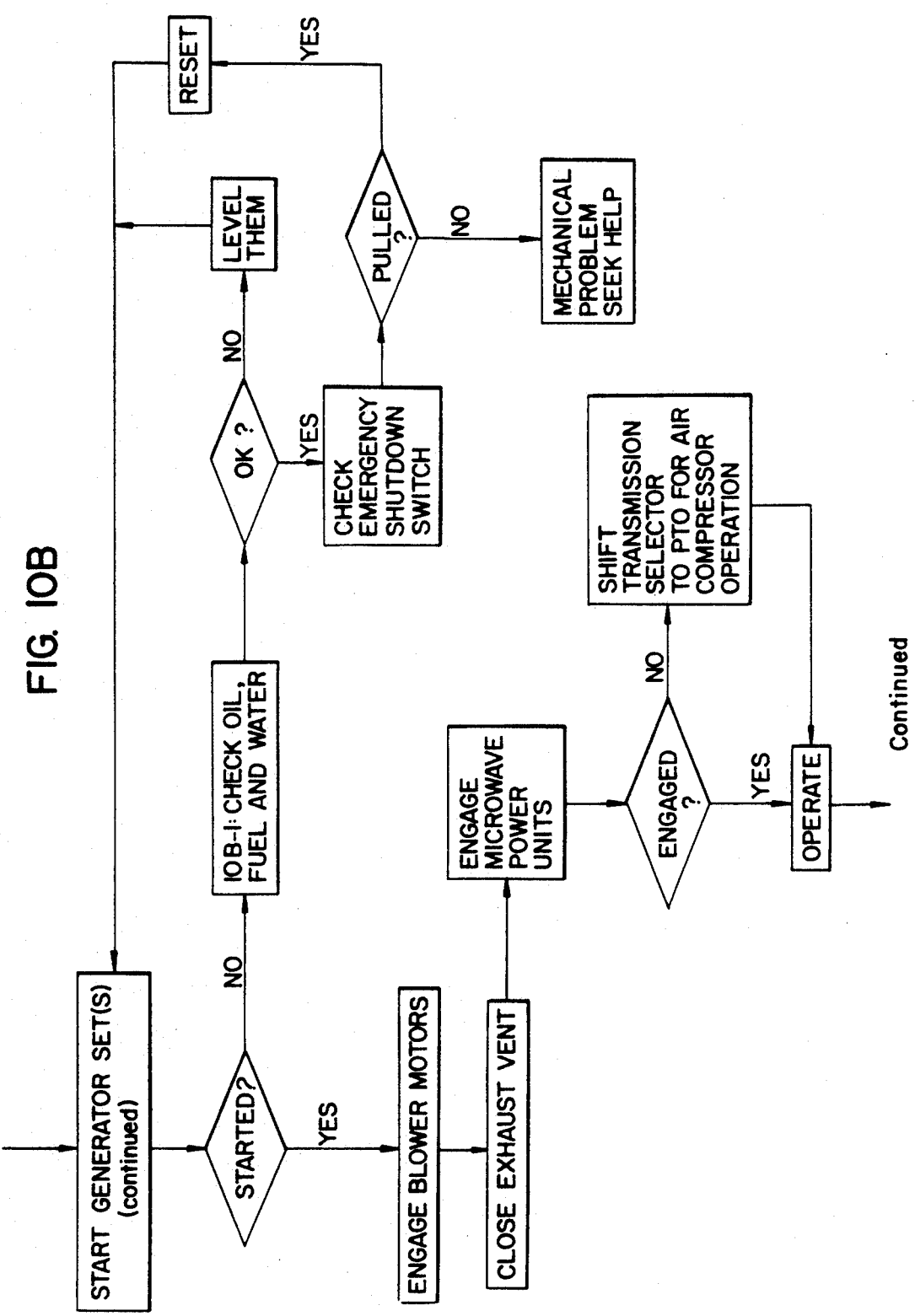
Figure 10C:
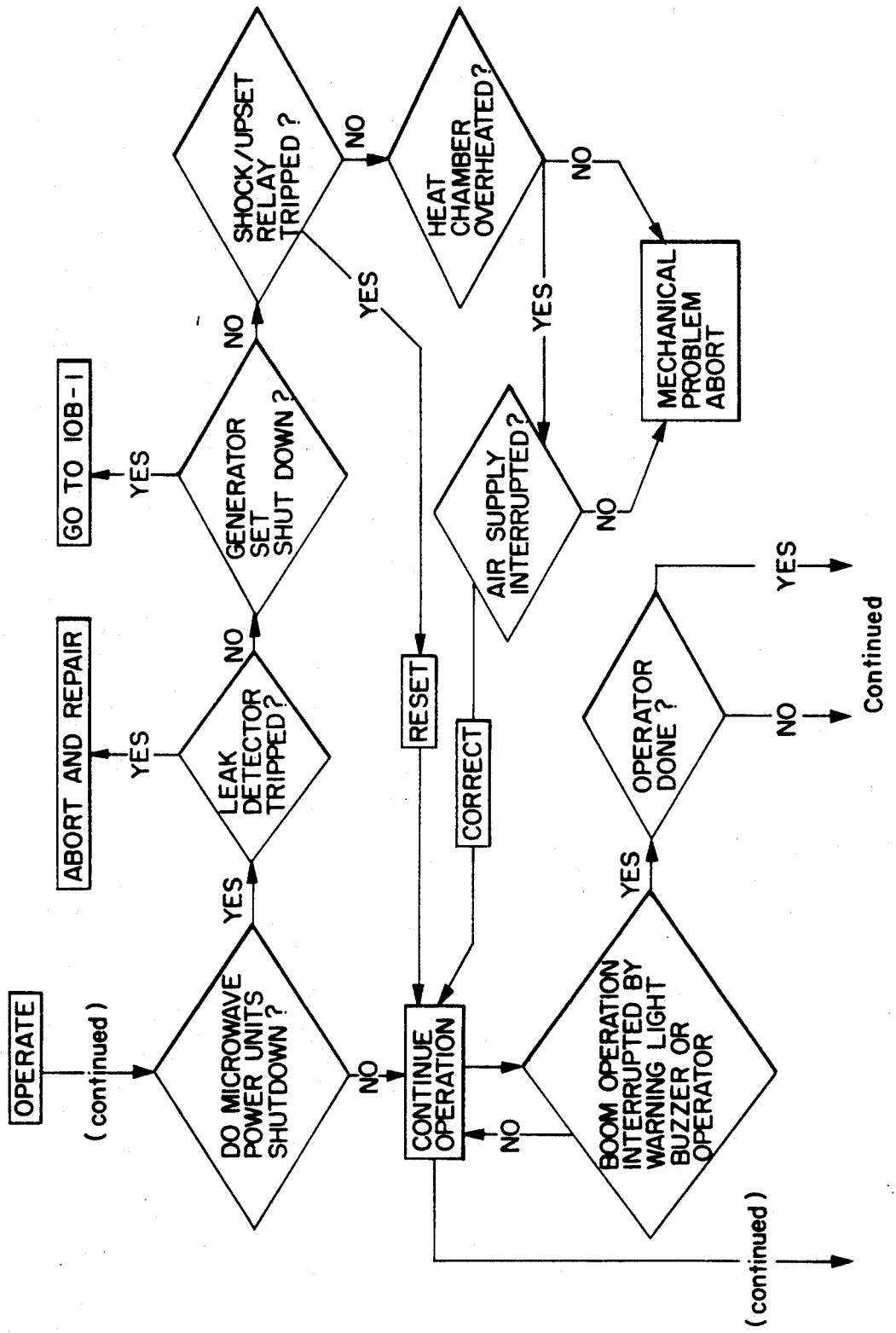
Figure 10D:
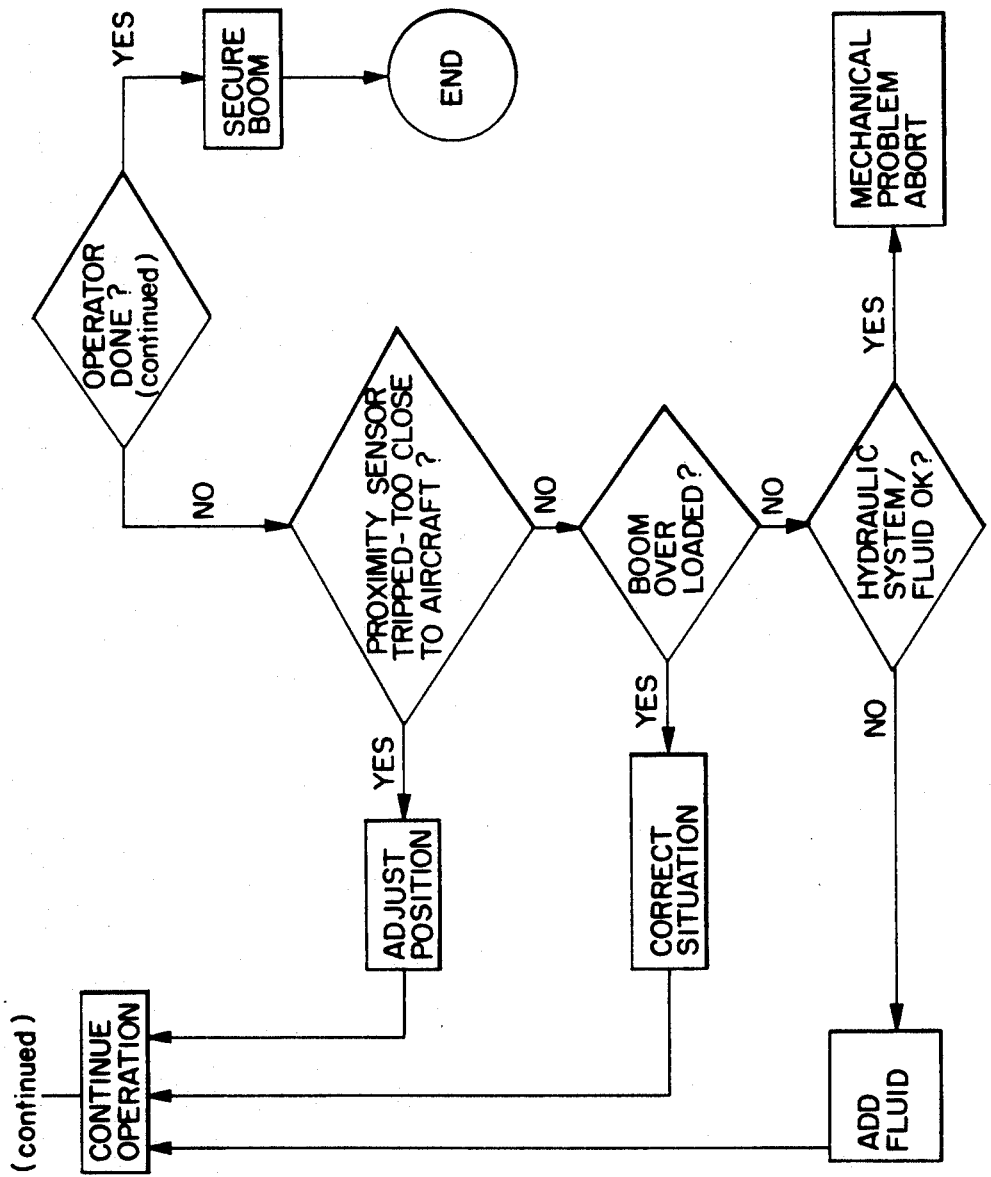

It is also preferable for the outer end 20C of the upper boom section to be pivotably mounted to the adjacent boom section 20B in a manner such that the outer end 20C can be pivoted to the right or to the left. A flexible boot 26 is connected between the adjoining ends of the boom sections. A vertical pin 27 provides the connection between the ends of the boom sections and enables the outer section 20C to pivot. See FIG. 8. A hydraulic cylinder or hydraulic motor provides the power for pivoting the outer section relative to the adjacent section. The degree of pivotable action may vary.

A boom operator's cab 28 is carried on outer boom section 20C. This enables the operator to be positioned adjacent to the air discharge head where he has a good view at all times of the discharge head and the surface to be cleared of ice. As a result, the operator can easily and precisely control its operation.

Figure 2:
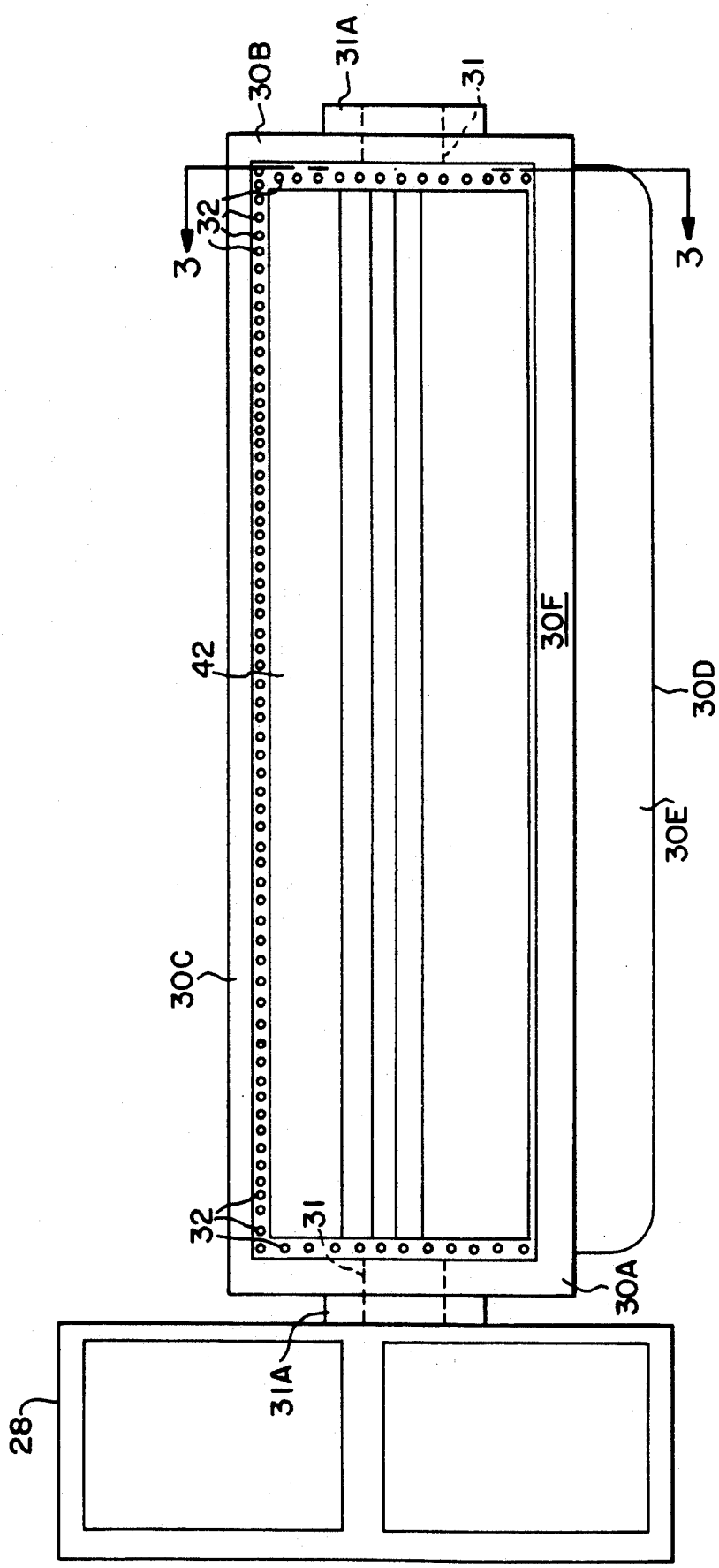
FIG. 2 is a front view of the air discharge head and boom operator's cab.
Figure 3:
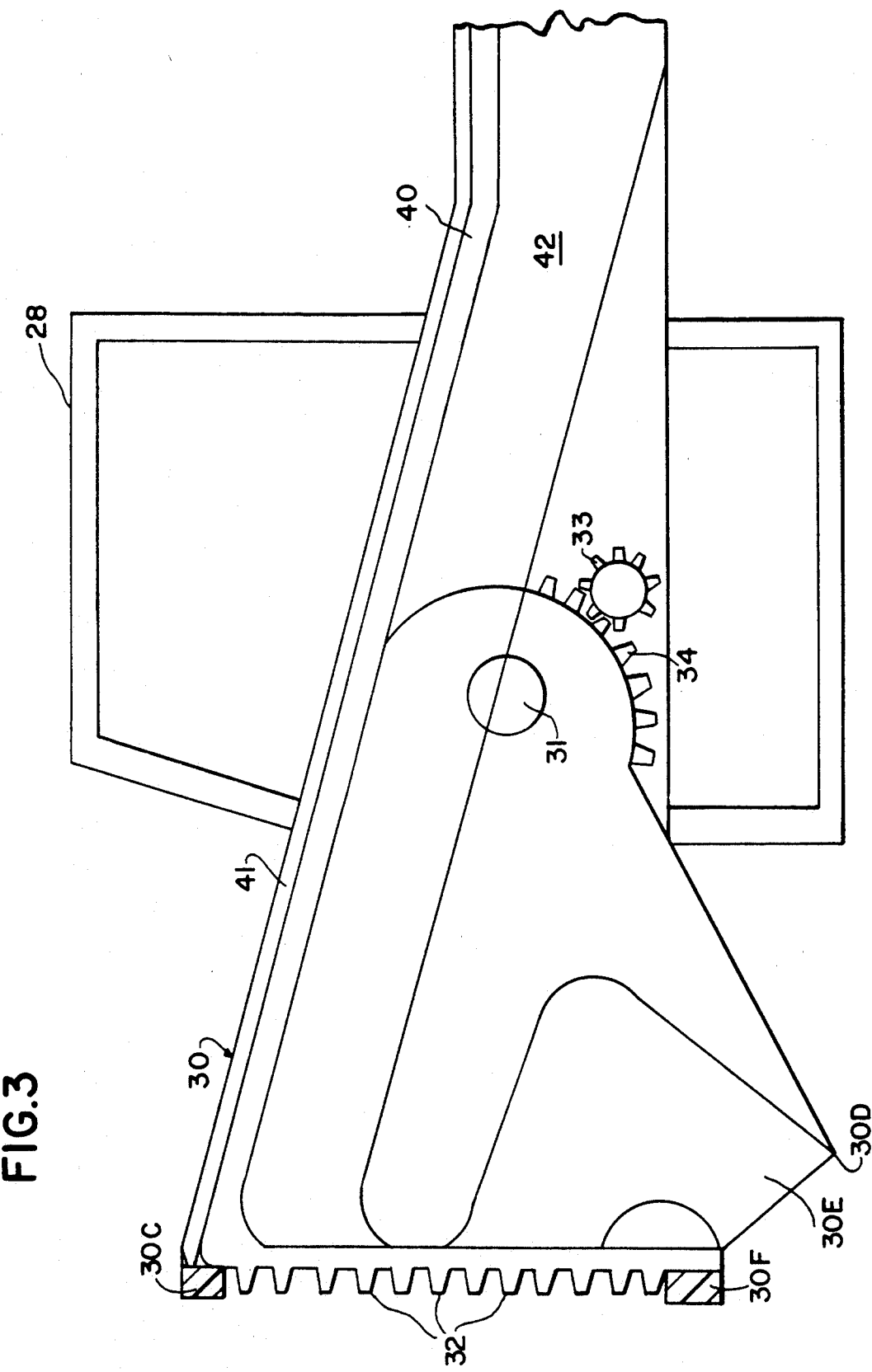
FIG. 3 is a cross-sectional view of the air discharge head taken along line 3—3 in FIG. 2.

A front elevational view of a preferred type of air discharge head 30 is illustrated in FIG. 2. A side elevational view of the head is shown in FIG. 3.

The opposing side edges 30A and 30B, the top edge 30C, and the lower edge 30F preferably comprise a compressible foam or sponge material to prevent scratching or other harm to the surface of the item being deiced. The thickness and width of the foam or sponge may vary. Typically a thickness of 3 or 4 inches and a width of 2 or 3 inches would be sufficient.

A plurality of outlet ports 32 are positioned along the top edge and opposing side edges of the discharge head for emitting compressed heated air for melting accumulated ice from a desired surface. The number and size of the outlet ports may vary, as desired, so long as sufficient heated air is discharged along the length of the discharge head to be effective in melting ice from the desired surface.

There are no outlet ports 32 along the bottom edge of the discharge head. Water created by the melting ice is intended to exit the discharge head through gap 30E. As shown in FIG. 3, the lower edge 30D is recessed back from the plane of the front of the discharge head so that an opening or gap 30E is created. This allows the water to fall downwardly and out below the air discharge head as the head is moved downwardly along the surface which is being deiced.

The discharge head may vary in shape and size. Preferably the head is at least about 10 feet long and at least about 4 feet high. A rectangular shape is both convenient and practical, but other shapes could also be used, if desired.

The compressed and heated air is fed to the discharge head through the boom via duct 40. At the front of the discharge head the duct widens out to extend along the length of the head. The duct also extends downwardly along each side edge of the head to feed compressed heated air to all of the outlet ports.

Through large duct 42 lower pressure heated air is fed through the length of the boom to the discharge head where it is permitted to exit through gap 42A (which is the area below the top edge and between the side edges of the discharge head). The heated air passing through duct 42 is essentially waste heat resulting from operation of the engine for propelling the apparatus and from operation of the engine used to power the generator 48. Duct work 46 serves to funnel the heated air to fan means 49 which pushes the air upwardly to the duct 42 in the boom. See FIG. 1A. The boom is insulated along its length to prevent unnecessary heat loss. A turbulent air flow is created by mixing the high pressure air (e.g., 50 to 200 psi) which exits from the outlet ports 32 with the lower pressure (e.g., 5 to 20 psi) heated air which exits from duct 42.

Figure 1A:
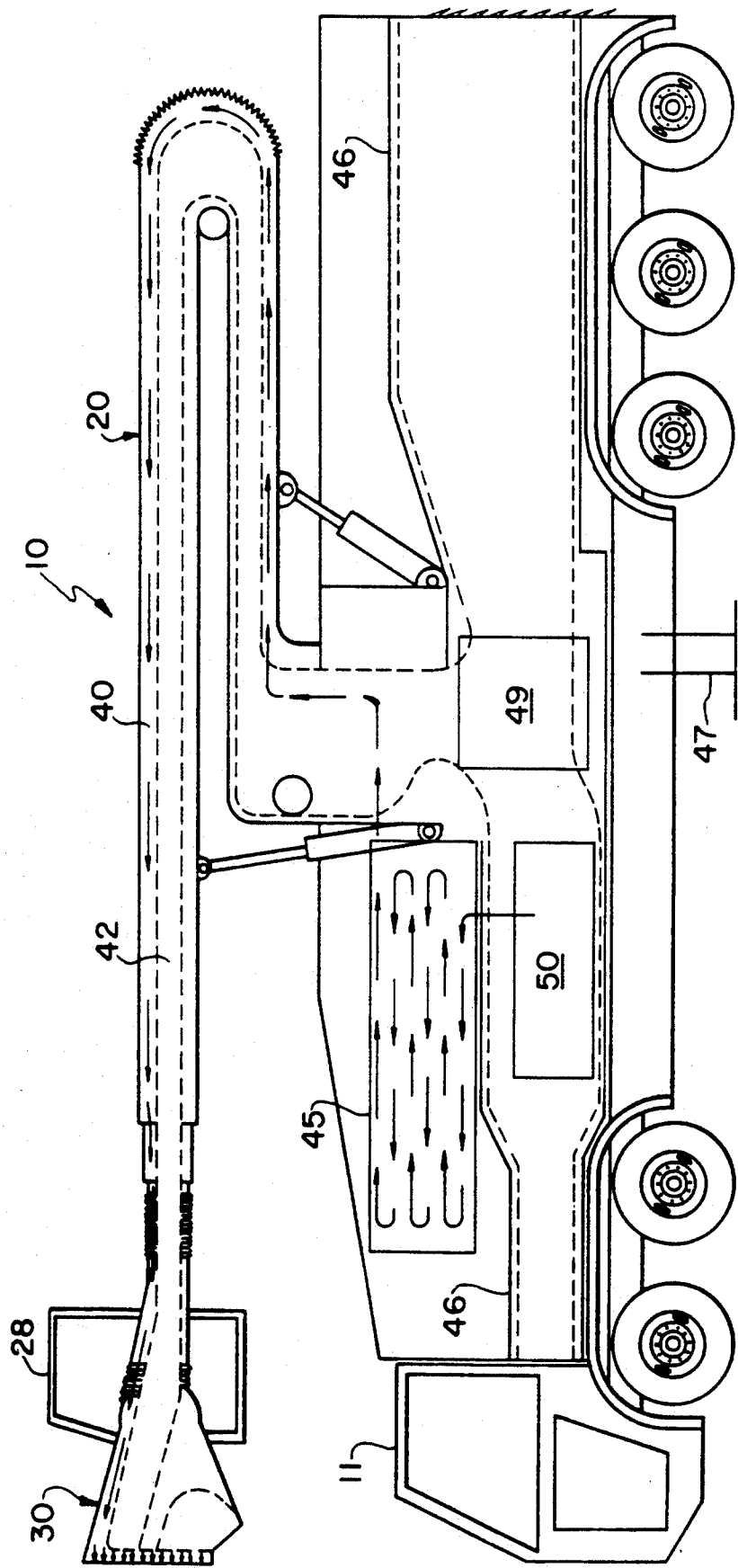
FIG. 1A is a side elevational view of the apparatus of the invention illustrating the air flow paths within the apparatus.
Figure 4:
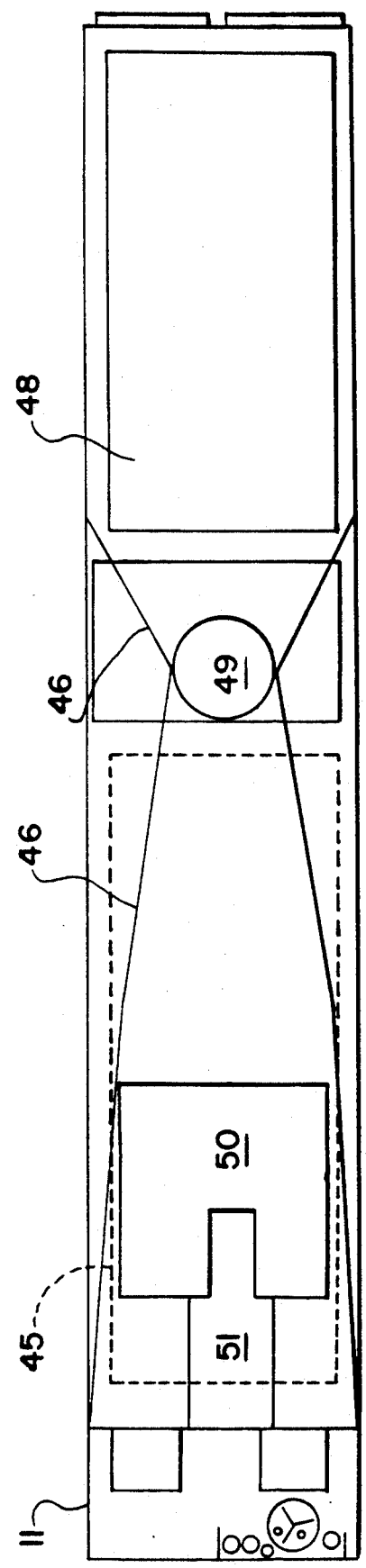
FIG. 4 is a top, partially cut-away, view of the apparatus shown in FIG. 1.
Figure 5:
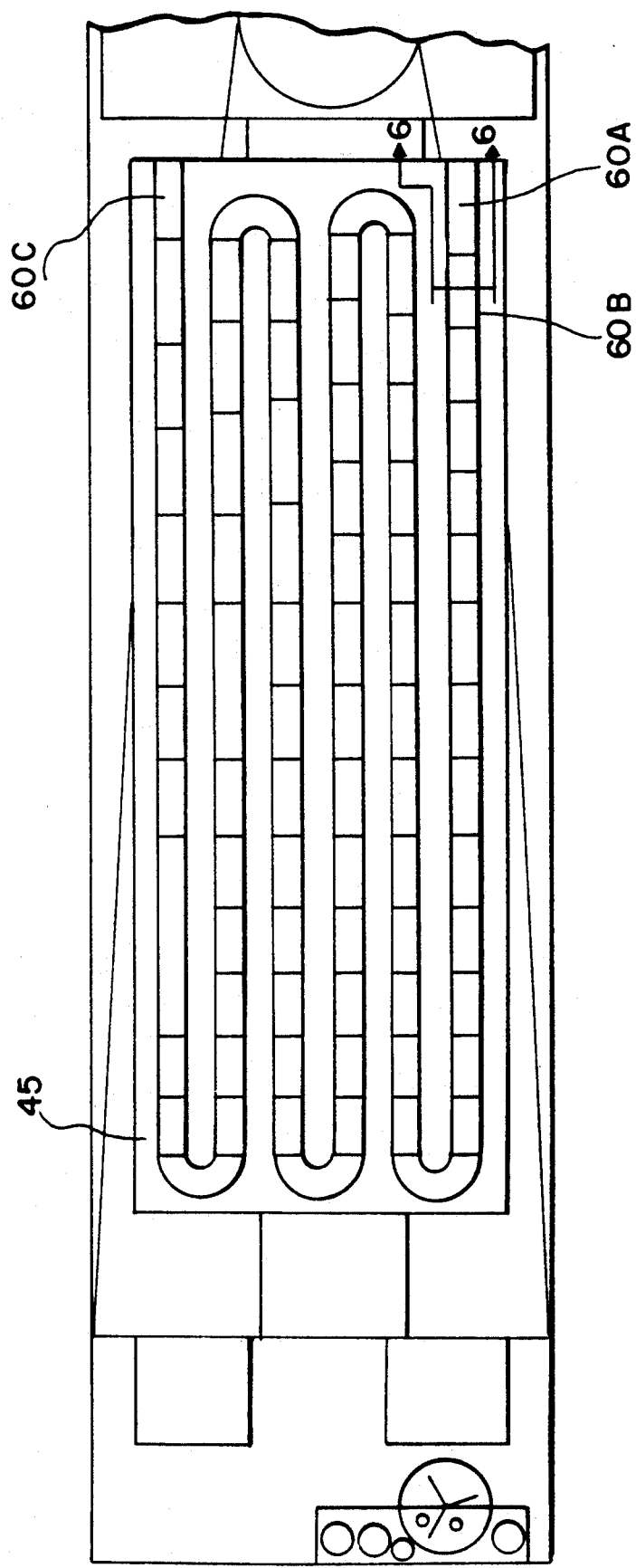
FIG. 5 is a top, partially cut-away, view of the apparatus of FIG. 1 showing the heat exchange chambers.

The compressed and heated air is produced by means of compressor 50 (driven by engine 51) which utilizes ambient air and compresses it to at least about 50 psi (and preferably to a pressure in the range of about 100 to 140 psi), after which the air is forced through heating chambers in the heat generator unit 45 (shown in FIGS. 1A, 4 and 5). The heated air is then passed through ducting 40 in the boom to the discharge head.

The air flow from the rotary air compressor 50 through the heating chamber 45 and into the duct 40 is illustrated in FIG. 1A. The air flow is shown by the arrows. Waste heat (i.e., heat from the engine and the generator unit) heats air and it is directed to fan means 49. This fan then pushes the air upwardly into large duct 42 where the air travels through the length of the boom and exits through the discharge head 30.

FIG. 5 is a top view, partially cut-away, showing the heat generating unit 45. Compressed air enters the generating unit 45 through inlet 60A. The air is heated as it passes through each unit or section 60B (of which there are a plurality). The volume heated air exits the generating unit through outlet 60C where it is forced into duct 40 in the boom. The temperature of the air at the discharge head is preferably in the range of about 200° to 1000° F. (and more preferably is in the range of about 500° to 800° F.).

Figure 6:
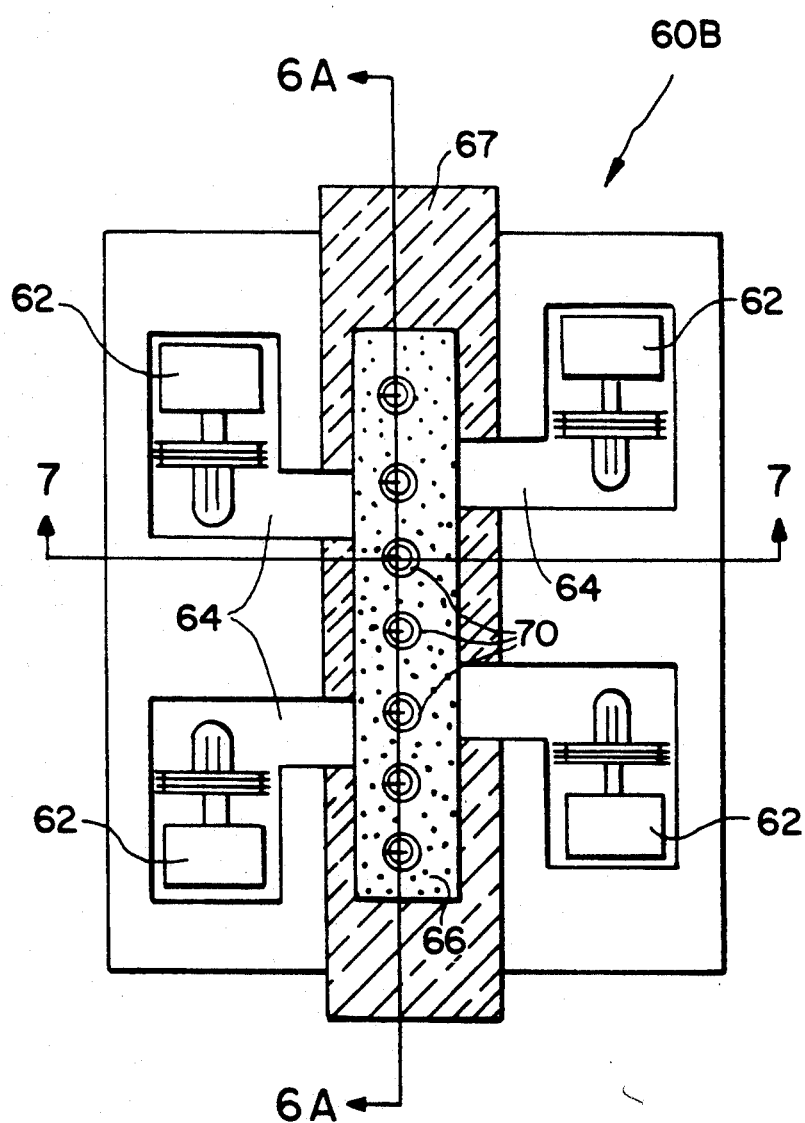
FIG. 6 is a cross-sectional view of a heat exchange chamber taken along line 6—6 in FIG. 5.

FIG. 6 is a cross-sectional view of one heating chamber 60B showing a plurality of microwave generating units 62, guide tubes 64, and chamber 66. Extending through chamber 66 are a plurality of air tubes 70.

Chamber 66 is filled with carbon which absorbs the microwaves generated by the generating units or magnetrons 62. As it absorbs the microwaves, the carbon becomes heated to a high temperature. This heat is transferred to the tubes 70, which in turn transfers the heat to air passing through the tubes. If desired, the metal tube may be coated or surrounded by a layer of ceramic or cermet.

Baffles may be included in tubes 70 to assist in transferring heat to the air. For example, there may be used spiral fliting or other types of highly heat conductive baffles.

The magnetrons 62 used in the heat generating unit or chamber are conventional and are commercially available. For example, they may be obtained from Panasonic as model 2M210-M1Z. They may also be obtained from Amana, for example. Larger or higher wattage microwave generators can also be used (e.g., a klystron amplifier Model VKS 8269A which is available from Varian). By increasing the wattage of the microwave generator it is possible to reduce the number of microwave generators required to heat a given volume of air.

Electrical energy generated by generator unit 48 may be supplied, for example, as high voltage AC current which is sent to a half wave voltage doubler circuit (which may be comprised of a single diode and one capacitor) to produce high voltage DC current. The DC current is supplied to the magnetrons to produce the microwaves.

There may be used any desired number of magnetrons. The more magnetrons that are used the more microwaves there ar generated.

The amount of carbon surrounding the air tubes may vary. If too great an amount of carbon is present, then the air in the tubes may not be heated to the desired extent.

Figure 6A:
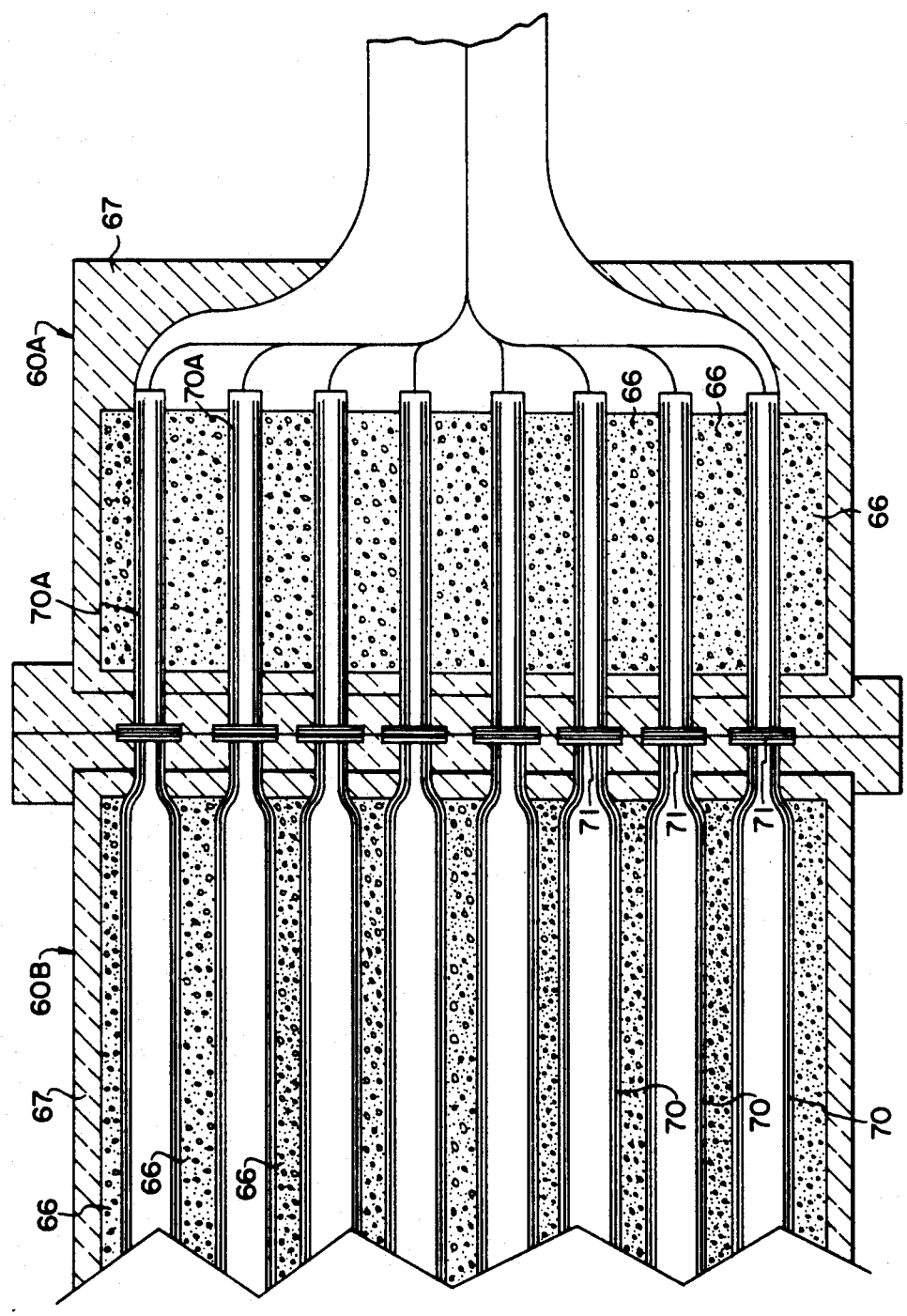
FIG. 6A is a cross-sectional view taken along line 6A—6A in FIG. 6.

FIG. 6A is a cross-sectional view showing the air tubes 70 surrounded by carbon 66 in section 60B. In adjoining section 60A the tubes 70A are smaller in diameter. Tubes 70A are connected to tubes 70 by means of joints 71. Air enters the inlet section 60A from the air compressor. The air flow is illustrated by the arrows. It passes through each tube 70A and into tubes 70 which are larger in diameter. Carbon also surrounds tubes 70A. Tubes 70 are larger than tubes 70A because the air expands as a result of being heated as it moves from section 60A to section 60B.

In successive sections the air tubes become larger in diameter to accommodate the expanding air. As a result, the amount of carbon surrounding the tubes correspondingly decreases. Insulation 67 surrounds the carbon to prevent external heat loss.

Figure 7:
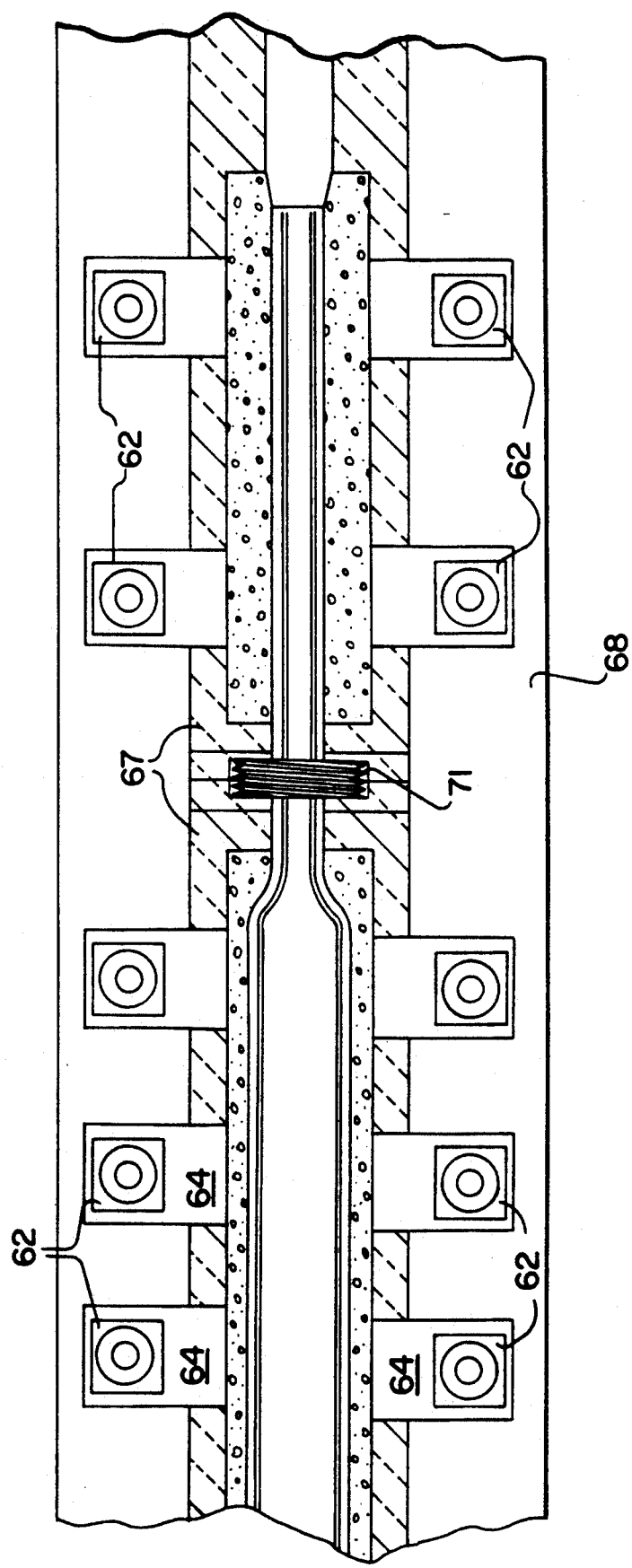
FIG. 7 is a cross-sectional view of a heat exchange chamber taken along line 7—7 in FIG. 6.

FIG. 7 is a cross-sectional view taken along line 7—7 in FIG. 6. Open areas 68 around the magnetrons 62 allow cooling air to flow past the magnetrons and thereby prevent overheating of the magnetrons.

As another permissible variation, the air discharge head may also include means for applying an ice retardant composition to the surface being deiced. For example, the top edge of the air discharge head may include nozzles for spraying a waxy composition to the surface after deicing. Alternatively, the composition may be pumped into the foam or sponge strip at the top edge (e.g., through duct 41) so that it can be wiped onto the surface after deicing.

Preferably the ground operator's cab 11 includes a duplication of all of the boom operator's controls, including emergency warning and shut down devices or switches, safety monitoring devices, and all hydraulic controls. Both cabs also preferably contain two-way radios.

FIGS. 9A through 9D are block diagrams explaining the sequences and steps followed in using the apparatus to deice aircraft. After the truck is positioned, stopped, and stabilized, the transmission is disengaged from the driveline and the power takeoff is engaged to operate the rotary air compressor 50. After the air compressor is engaged, the generator 48 is started using either a conventional two-way valve and solenoid (not shown) or conventional batteries and electrical starters (not shown). The solenoid on the air compressor must be in the heat exchange supply position in order to activate the microwave power sources. This control is located in the ground operator's cab 11.

FIGS. 10A through 10D are block diagrams explaining various safety considerations involved in operating the apparatus of the invention.

Other variants are possible without departing from the scope of this invention.

What is claimed is:

1. Mobile apparatus useful for melting accumulated ice from surfaces, said apparatus comprising:
    (a) a frame;
    (b) a power source for propelling the frame;
    (c) a heat source for heating air;
    (d) compressor means for compressing air;
    (e) boom means carried by said frame; said boom including a discharge head; wherein said discharge head includes a top edge and opposite side edges; wherein said discharge head further includes a plurality of outlet ports for said heated air disposed along said top edge and also along each said side edge;
    (f) air conduit means carried by said boom for guiding heated air from said heat source; and
    (g) control means for controlling the position of said boom means;
wherein said heated air is discharged through said discharge head.

2. Apparatus in accordance with claim 1, wherein said boom means is extensible and wherein said discharge head can be tilted upwardly and downwardly.

3. Apparatus in accordance with claim 1, wherein said top edge includes a compressible foam strip therealong.

4. Apparatus in accordance with claim 1, wherein said heat source comprises (a) a plurality of microwave generating means, and (b) microwave absorbing means; wherein the compressed air is passed in heat-conductive contact with said absorbing means.

5. Apparatus in accordance with claim 4, wherein said absorbing means comprises carbon, and further comprising air tubes disposed in close proximity to said absorbing means.

6. Mobile apparatus useful for melting accumulated ice from surfaces, said apparatus comprising:
    (a) a wheeled frame;
    (b) a power source for propelling the frame;
    (c) a heat source for heating air; wherein said heat source comprises (1) at least one microwave generating means, and (2) microwave absorbing means;
    (d) compressor means for compressing air;
    (e) boom means carried by said frame; said boom including a discharge head; wherein said boom means is extensible; wherein said discharge head includes a top edge and opposite side edges; wherein said discharge head further includes a plurality of outlet ports for said heated air disposed along said top edge and also along each said side edge;

(f) air conduit means carried by said boom for guiding heated air from said heat source to said discharge head; and (g) control means for controlling the position of said boom means.

7. Apparatus in accordance with claim 6, wherein said discharge head can be tilted upwardly and downwardly.

8. Apparatus in accordance with claim 6, wherein said top edge and said side edges further include a compressible foam strip therealong.

9. Apparatus in accordance with claim 6, wherein said absorbing means comprises carbon, and further comprising air tubes disposed in close proximity to said absorbing means.

10. Apparatus in accordance with claim 9, wherein said air tubes comprise metal.

11. Apparatus in accordance with claim 6, wherein there are a plurality of microwave generating means.

* * * * *